(12) United States Patent
Kozel et al.

(10) Patent No.: US 6,264,481 B1
(45) Date of Patent: Jul. 24, 2001

(54) TRANSCEIVER SOCKET (75) Inventors: Charles A. Kozel, McHenry; John T. Scheitz, Barrington; Steven Pulchinski, Rolling Meadows, all of IL (US)

(73) Assignee: Methode Electronics, Inc., Chicago, IL (US)

( * ) Notice: Subject to any disclaimer, the term of this patent is extended or adjusted under 35 U.S.C. 154(b) by 0 days.

(21) Appl. No.: 09/396,816

(22) Filed: Sep. 14, 1999

(51) Int. Cl.$^7$ .......................... H01R 4/66; H01R 13/648
(52) U.S. Cl. .............................. 439/92; 385/88
(58) Field of Search ..................... 439/607, 95, 947, 439/108, 92, 573; 385/88

(56) References Cited

U.S. PATENT DOCUMENTS

| | | | |
|---|---|---|---|
| 2,924,809 | * 2/1960 | Wilson | 439/573 |
| 5,277,592 | * 1/1994 | Morlion | 439/108 |
| 5,961,337 | * 10/1999 | Kordes | 439/141 |
| 6,074,228 | * 6/2000 | Berg et al. | 439/180 |

OTHER PUBLICATIONS

One (1) Advance Data Sheet: "NetLight™ 1417K4A 1300 nm Laser 2.5 Gbits/s SpeedBlaster™ Transceiver, Jul. 1998," by Lucent Technologies; and Two (2) Presentations: "Surface Mount Technology Small Form Factor Study Group, Feb. 8, 1999," and "Surface Mount Technology SFF Optical Transceiver Study Group, Jun. 7, 1999" both of which were found on the internet website which was last updated on Aug. 31, 1999.

* cited by examiner

*Primary Examiner*—Renee Luebke
*Assistant Examiner*—Felix O. Figueroa
(74) *Attorney, Agent, or Firm*—Karl D. Kovach; David L. Newman

(57) ABSTRACT

A transceiver socket for receiving a transceiver. The transceiver socket includes a pinboard and a retention ground clip. The pinboard has a first surface and a second surface. The pinboard further includes a first attaching post receptacle, a second attaching post receptacle, and a plurality of pin receptacles. Each of the receptacles has an opening on the first surface of the pinboard. Each of the opening being positioned relative to each other so as to receive the attaching posts and pins of the small form factor transceiver. The first attaching post receptacle, the second attaching post receptacle, and the pin receptacles each have a portion protruding from the second surface of the pinboard. The retention ground clip having first and second arms extending from a retention ground clip body. The first and second arms shaped for surrounding and contacting a portion of a surface of the small form factor transceiver so as to ground the surface of the small form factor transceiver to the first and second attaching post receptacles.

17 Claims, 8 Drawing Sheets

TRANSCEIVER SOCKET

BACKGROUND OF THE INVENTION

1. Field of the Invention

The present invention pertains to an electrical socket for receiving an electrical component. The invention more particularly concerns a socket mounted to a circuit board, where the socket receives a transceiver such as a small form factor (SFF) transceiver.

2. Discussion of the Background

The electronics industry is an industry where the competition is fierce. Customers of electronic suppliers require that the finished product perform as specified and that the price be as low as possible. Pricing pressures exist since there are many electronic suppliers and the customers demand high quality, low price, and custom built products. Many electronics suppliers supply products of acceptable quality or otherwise they would not stay in business. So, the electronics suppliers differentiate themselves from other suppliers by offering their products at the lowest possible price or by providing features or services to the customers that other suppliers are either unable or unwilling to provide.

Additionally, due to the unique demands of a diverse customer base, electronics suppliers can no longer make a one-size-fit-all product. Such requirements tend to increase the cost of the finished product. For instance, if ten different customers want ten different versions of an optoelectronic bidirectional data transceiver included in their product, then the electronics supplier will have to inventory ten different versions of the transceiver. For example, the customer may want a small form factor transceiver. More importantly, the electronics supplier may have to attach ten different versions of the small form factor transceiver to a printed circuit board and then track those printed circuit boards throughout the factory. The finished printed circuit board is acceptable to only one customer. So, if the printed circuit board is to be salvaged, then the small form factor transceiver must be removed from the printed circuit board with a soldering iron. Hopefully, during the removal process, other components on the printed circuit board are not destroyed. An additional drawback exists when a customer wants to change the version of the small form factor transceiver that is on their printed circuit board, the customer will either send the printed circuit board back to the manufacturer for re-work, or the customer will purchase a new printed circuit board containing the desired small form factor transceiver.

Figure 1:
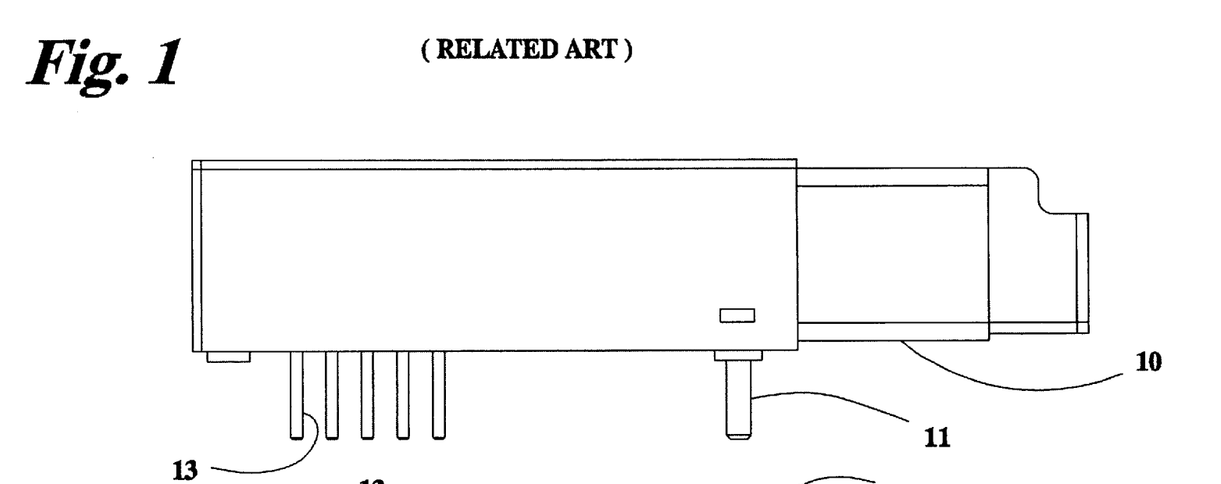
FIG. 1 is a side view of a small form factor transceiver.

A side view of an example of a present commercial embodiment of a small form factor transceiver 10 is shown in FIG. 1. A SFF transceiver document entitle "NetLight 1417K4A 1300nm Laser 2.5 Gbits/s SpeedBlaster Transceiver" published by Lucent Technologies on July 1998, describes in detail such a transceiver. The dimensions of the present SFF transceiver module are provided therein for reference. The present invention is not limited to a transceiver socket of any particular dimensions. Furthermore, the present invention is not limited to a transceiver socket only for small form factor transceivers. The present invention may provide a socket for other known transceivers and modules such as 1×9's, GLMs, etc.

Figure 2:
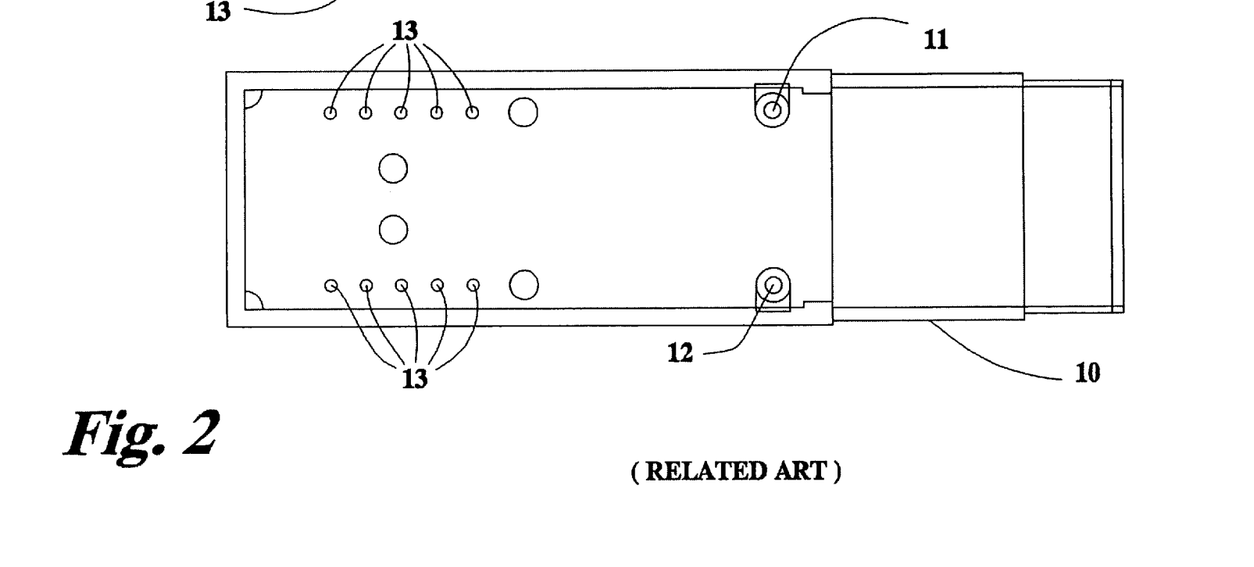
FIG. 2 is a bottom view of the small form factor transceiver of FIG. 1.

FIG. 2 is a bottom view of the small form factor transceiver 10.

Figures 3, 4, 5:
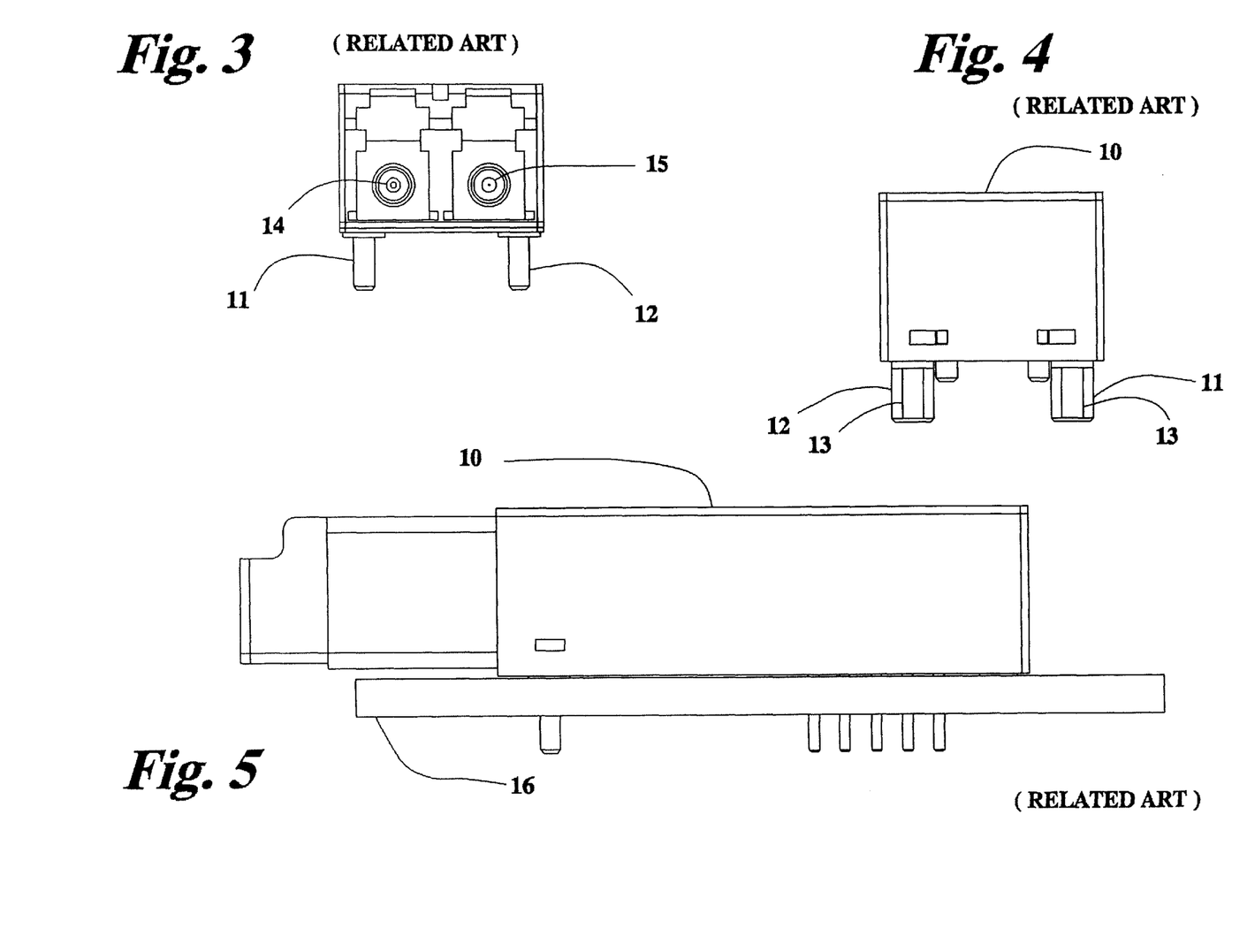
FIG. 3 is a connector port end view of the small form factor transceiver of FIG. 1.
FIG. 4 is another end view of the small form factor transceiver of FIG. 1.
FIG. 5 is a side view of the small form factor transceiver of FIG. 1 connected to a printed circuit board.

FIG. 3 is a connector port end view of the small form factor transceiver 10 displaying the placement of the connector ports 14, 15.

FIG. 4 is another end view of the small form factor transceiver 10.

FIG. 5 is a side view of the small form factor transceiver 10 mounted to a printed circuit board 16. The small form factor transceiver 10 is, typically, permanently soldered inplace on the printed circuit board 16.

Figure 6:
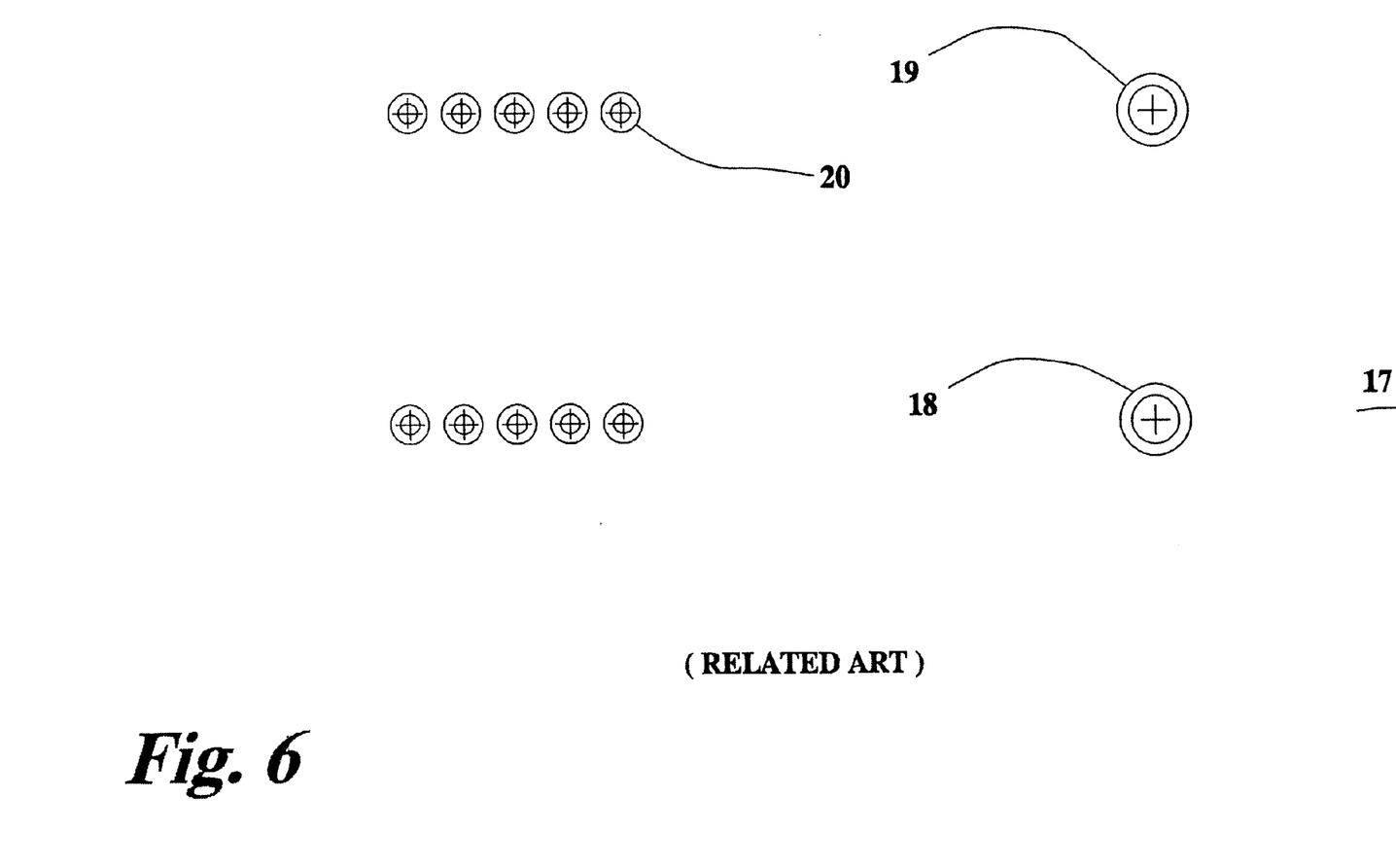
FIG. 6 is a printed circuit board land pattern used for mating the printed circuit board with the attaching posts and pins of the small form factor transceiver of FIG. 1.

FIG. 6 is a printed circuit board land pattern or footprint 17 which must be formed on the printed circuit board 16 so as to receive the small form factor transceiver 10. Conductive contact pads 18, 19 are formed for receiving the attaching posts 11, 12, and the conductive contact pads 20 are formed for receiving the pins 13. Each contact pad 18, 19, 20 has an opening for receiving the respective attaching post and pins. The arrangement of the footprint is one example for which the present invention may be applied or mounted.

The internal circuitry of transceivers can vary from one another depending on its type such as for an SFF and/or based on customer requirements. For instance, one customer may desire MT–RJ type connector ports, another customer may require LC connector ports, and still another customer may require VF45 connector ports. Additionally, the transceiver can be configured so as to receive signals from either a single mode fiber or a multi-mode fiber. Furthermore, the internal circuitry of the transceiver may be structured so as to accommodate signals operating at a long wavelength such as 1,300 nm, and another transceiver may have its signal conditioning hardware designed for receiving short wavelength signals operating at approximately 850 nm or at low speeds such as 622 MBaud or high speed such as 1.25 GBaud or with 5V or 3.3V power supply. Finally, the entire transceiver circuitry may vary depending on the system architecture requirements such as gigabit ethernet or fibre channel. Therefore, multiple versions of a small form factor transceiver can be created based upon customer requirements.

Therefore, there is a need for producing a transceiver socket that provides a low cost printed circuit board which can easily be changed between different versions of a standard component, by mounting a socket to the host PCB. All of the above variations to the transceiver may be made available to the host system without destroying the host PCB. By using a socket, the desired transceiver may simply be removed from the host PCB and another transceiver snapped in place.

Summary of the Invention

Therefore, it is an object of the present invention to provide a transceiver socket for receiving a tranceiver.

It is still another object of the invention to provide a transceiver socket which can repeatedly and removably, accept different versions of transceiver.

Yet another object of the invention is to provide a small form factor transceiver socket which is inexpensive when integrated as part of a printed circuit board.

It is a further object of the invention to provide a small form factor transceiver socket which electrically grounds the surface of the small form factor transceiver.

It is still another object of the invention to provide a small form factor transceiver socket which prevents the small form factor transceiver from falling out of the small form factor transceiver socket when subject to vibrations or inversion.

Another object of the invention is to provide a small form factor transceiver socket which has a low profile.

Still another object of the invention is to provide a transceiver socket which is surface mounted to a surface of the printed circuit board.

It is still yet another object of the invention to provide a transceiver socket which is wavesoldered soldered to the printed circuit board.

Yet another object of the invention is to provide a transceiver socket which is re-flow soldered to the printed circuit board.

In one form of the invention, the transceiver socket includes a pinboard and a retention ground clip. The pinboard has a first surface and a second surface. The pinboard further includes a first attaching post receptacle, a second attaching post receptacle, and a plurality of pin receptacles. Each receptacle has an opening on the first surface of the pinboard. Each opening being positioned relative to each other so as to receive the attaching posts and pins of the transceiver. The first attaching post receptacle, the second attaching post receptacle, and the pin receptacles each protruding from the second surface of the pinboard. The retention ground clip has first and second arms extending from a retention ground clip body. The first and second arms being shaped for surrounding and contacting a portion of a surface of the transceiver so as to ground the surface of the transceiver to the first and second attaching post receptacles.

Thus, Applicants's invention is superior to existing methods or apparatuses for attaching a transceiver to a printed circuit board. Applicants's invention provides a transceiver socket which removably receives a small form factor transceiver. Therefore, an electronics supplier can solder the small form factor transceiver socket to a printed circuit board and, then, at a later time, the desired transceiver can be mounted onto the small form factor transceiver socket per the customer's request. Additionally, the customer may, at a later time, swap out one version of the transceiver for another version of the transceiver. Therefore, a customer's unique order can be filled while reducing the electronics suppliers cost due to inventory, re-work, tracking, and scrap. These and other features of the invention are set forth below in the following detailed description of the presently preferred embodiments.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENTS

Referring now to the drawings, wherein like reference numerals designate identical or corresponding parts throughout the several views, and more particularly to FIGS. 7–11 and 17 thereof, a first embodiment of the present invention is a small form factor (SFF) transceiver socket 30. Although the socket is shown in the preferred embodiment receiving an SFF transceiver, a similar socket with slight dimension changes and re-orientation of pin receptacles and attaching post receptacles could receive other types of transceivers.

Figure 7:
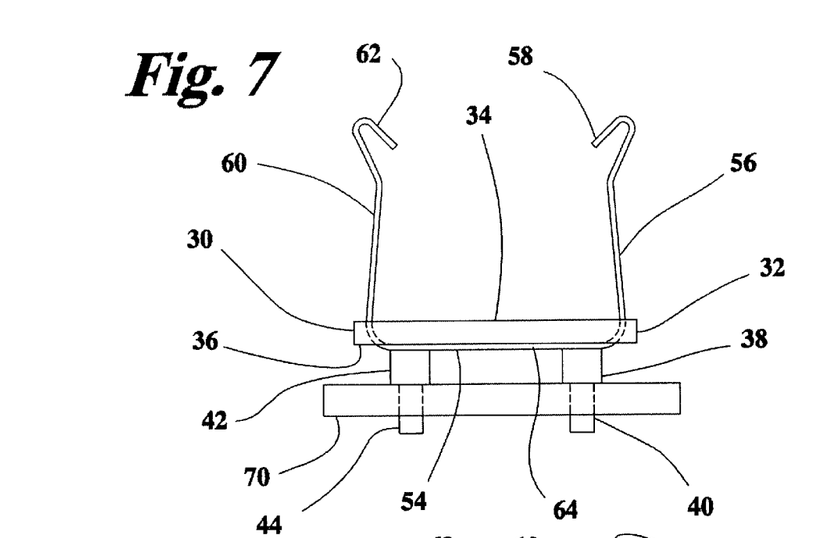
FIG. 7 is an end view of the small form factor transceiver socket mounted to a printed circuit board.

FIG. 7 is an end view of the small form factor transceiver socket 30 mounted to a printed circuit board 70. The small form factor transceiver socket 30 shown in FIGS. 7–11 is a through hole device. The small form factor transceiver socket 30 includes a pinboard or substrate 32, a first attaching post receptacle 38, a second attaching post receptacle 42, and a retention ground clip 54. The first attaching post receptacle 38 includes a projecting portion 40. The second attaching post receptacle 42 includes a projecting portion 44. The retention ground clip 54 includes a first arm 56 and a second arm 60 both of which extend from a body 64. The first arm 56 has a first turned back portion 58 and the second arm 60 has a second turned back portion 62. The pin board 32 has a first surface 34 and a second surface 36. Relative to the retention ground clip 54, the pinboard 32 is substantially rigid.

Figure 8:
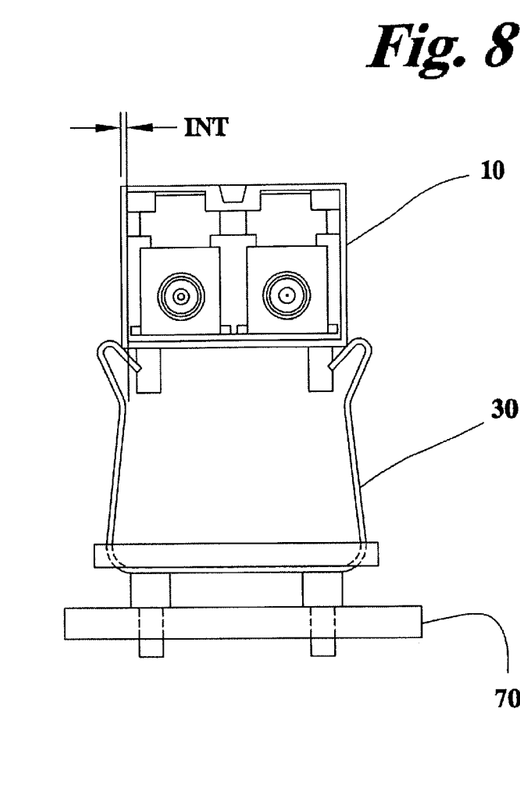
FIG. 8 is an end view of the small form factor transceiver socket of FIG. 7 with a small form factor transceiver about to be mated to the small form factor transceiver socket.

FIG. 8 is an end view of the small form factor transceiver socket 30 with a small form factor transceiver 10 about to be introduced into the retention ground clip 54. The assembly steps of the present invention include the mounting of the socket 30 to the PCB 70, preferably at the same time that the rest of the PCB 70 is being populated with other components. The PCB 70 is put through a soldering process to secure the socket thereto. Then the transceiver may be mounted to the socket. This may occur at a remote location and time. The attaching post receptacle and pin receptacle projecting portions are dimensioned so that a zero insertion force is required to mount the socket to the PCB.

FIG. 8 further shows the interference fit between the small form factor transceiver 10 and the small form factor transceiver socket 30. The amount of interference between the two components is designated by designator INT in FIG. 8. Preferably, the amount of interference on each side of the small form factor transceiver 10 is the same, where the interference INT is equal to 0.015 inches. Such interference provides for a low insertion force of less than one pound force per arm to insert the transceiver 10 within the socket 30.

Figure 9:
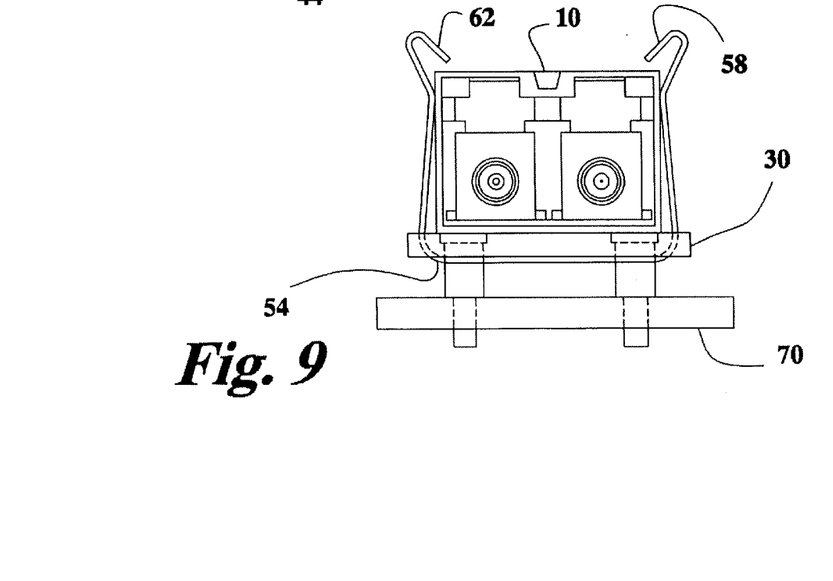
FIG. 9 is an end view of the small form factor transceiver socket of FIG. 7 with the small form factor transceiver mounted therein.

FIG. 9 is an end view of the small form factor transceiver socket 30 with the small form factor transceiver 10 mounted therein. FIG. 9 illustrates that the first and second turned back portions 58, 62 positively retain the small form factor transceiver 10 within the small form factor transceiver socket 30.

Figure 10:
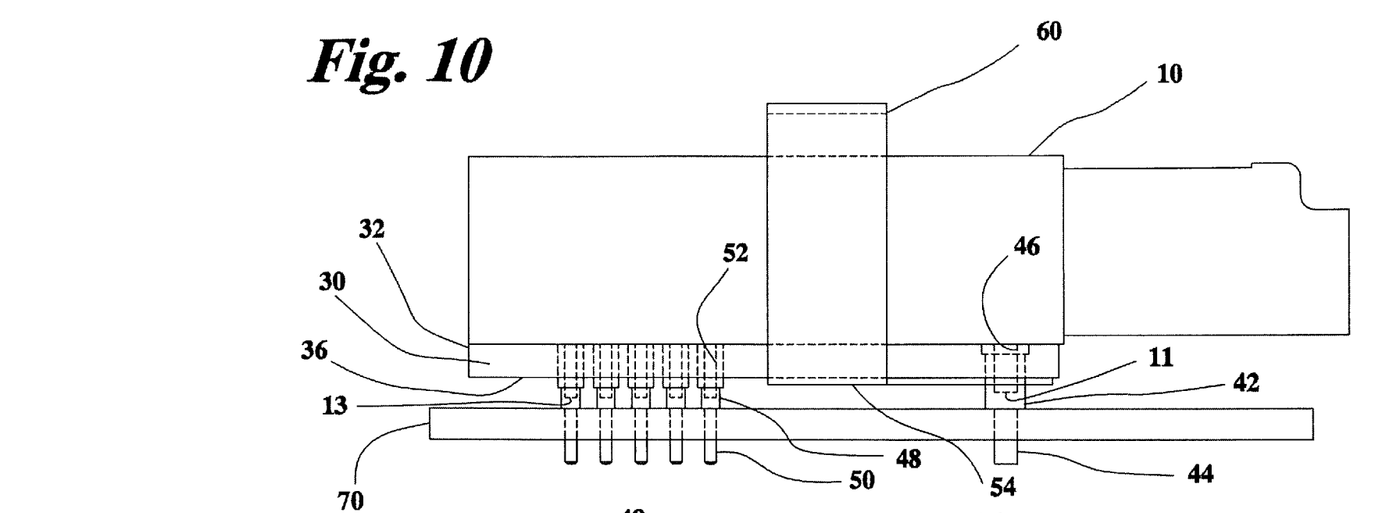
FIG. 10 is a side view of the small form factor transceiver socket having a small form factor transceiver mounted therein of FIG. 9.
Figure 11:
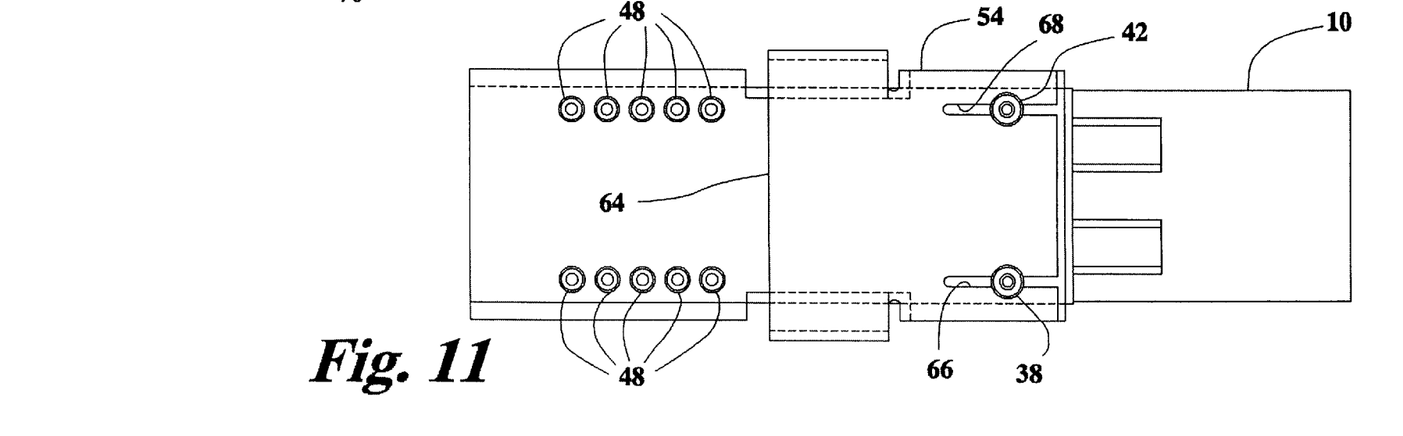
FIG. 11 is a bottom view of the small form factor transceiver socket of FIG. 10 with the printed circuit board removed.

FIG. 10 is a side view of the small form factor transceiver socket 30 with the small form factor transceiver 10 mounted therein. The small form factor transceiver socket 30 is mounted to the printed circuit board 70. The pinboard 32 has a plurality of pin receptacles 48 where each pin receptacle has a protruding portion 50, or mounting members, which mates with the printed circuit board 70. Furthermore, each pin receptacle 48 has an opening 52, or contact receiving area into which the pins 13 of the small form factor transceiver 10 are introduced. The pinboard 32 has the first and second attaching post receptacles 38, 42 and their associated projecting portions 40, 44 protruding from the second surface 36 of the pinboard 32. Each attaching post receptacle 38, 42 has an opening 46 into which the respective attaching post 11, 12 of the small form factor transceiver 10 are introduced Additionally, as shown in FIG. 10, the pinboard or substrate 32 is disposed between the transceiver 10 and the printed circuit board FIG. 11 is a bottom view of the small form factor transceiver socket 30 having attached therewith the small form factor transceiver 10 with the printed circuit board 70 removed from view. FIG. 11 further clarifies the arrangement of pin receptacles 48 and the first and second attaching post receptacles 38, 42. The arrangement of the openings 52 of the pin receptacles 48 and the openings 46 of the first and second attaching post receptacles 38, 42 is essentially identical to the printed circuit board land pattern 17 illustrated in FIG. 6. FIG. 11 further illustrates the retention ground clip 54 which has a first flexible groove 66 and a second flexible groove 68. The first flexible groove 66 is spring loaded about the first attaching post receptacle 38 and the second flexible groove 68, likewise is compression-mounted around the second attaching post receptacle 42. Thus, in assembly of the small form factor transceiver socket 30, the retention ground clip 54 is formed as a separate part and is later snap-fitted about the pinboard 32.

In operation, as shown in FIG. 8, the small form factor transceiver 10 is pushed toward the small form factor transceiver socket 30. Upon touching the first and second turned back portions 58, 62 of the retention ground clip 54, the first and second arms 56, 60 elastically expand so as to accept the small form factor transceiver 10 therein. Once the small form factor transceiver 10 is securely positioned on the pinboard 32, the first and second arms 56, 60 of the retention ground clip 54 spring back toward the undeflected position, but are stopped short thereof due to contact with the body of the small form factor transceiver 10. The contact between arms 56, 60 of the retention ground clip 54 provides electrical conductivity between the conductive surface of the small form factor transceiver 10 and the retention ground clip 54 Thus, the retention ground clip 52 performs a retaining function and a grounding function. Each of these functions can be performed by separate members or devices, such as a ground member for grounding and a retention member for retaining.

The pins 13 and the attaching posts 11, 12 of the small form factor transceiver 10 are respectively introduced into openings 52, 46 of the pin receptacles 48 and the first and second attaching post receptacles 38, 42 of the small form factor transceiver socket 30. The electrical conductivity between the attaching posts 11, 12 and the attaching post receptacles 38, 42 complete the ground circuit to the printed circuit board 70. Likewise, each of the pins 13 make electrical contact with the pin receptacles 48 which in turn makes electrical contact with the respective circuits on the printed circuit board 70. Typically, the small form factor transceiver socket 30 is wave soldered to the printed circuit board 70. The retention ground clip 54 ensures that the small form factor transceiver 10 does not become separated from the small form factor transceiver socket 30 due to vibration or inversion of the printed circuit board 70.

To remove the small form factor transceiver 10 from the small form factor transceiver socket 30, first and second arms 56, 60 of the retention ground clip 54 are urged away from each other so as to provide clearance between the turned back portions 50, 62 of the retention ground clip 54 and the body of the small form factor transceiver 10. Thereupon, the pins 13 and attaching posts 11, 12 of the small form factor transceiver 10 can be pulled out of the receptacles located in the pinboard 32.

The retention ground clip 54 is preferably made out of a conductive, spring metal material, such as a copper alloy or stainless steel alloy, or other suitable engineering material having spring-like, elastic material properties. The pinboard 32 is preferably made out of an insulated polymer material such as liquid crystal polymer (LCP). The receptacles 48, 42, 38 are made out of commonly known conductive-type material used in engineering applications.

Figures 12, 13:
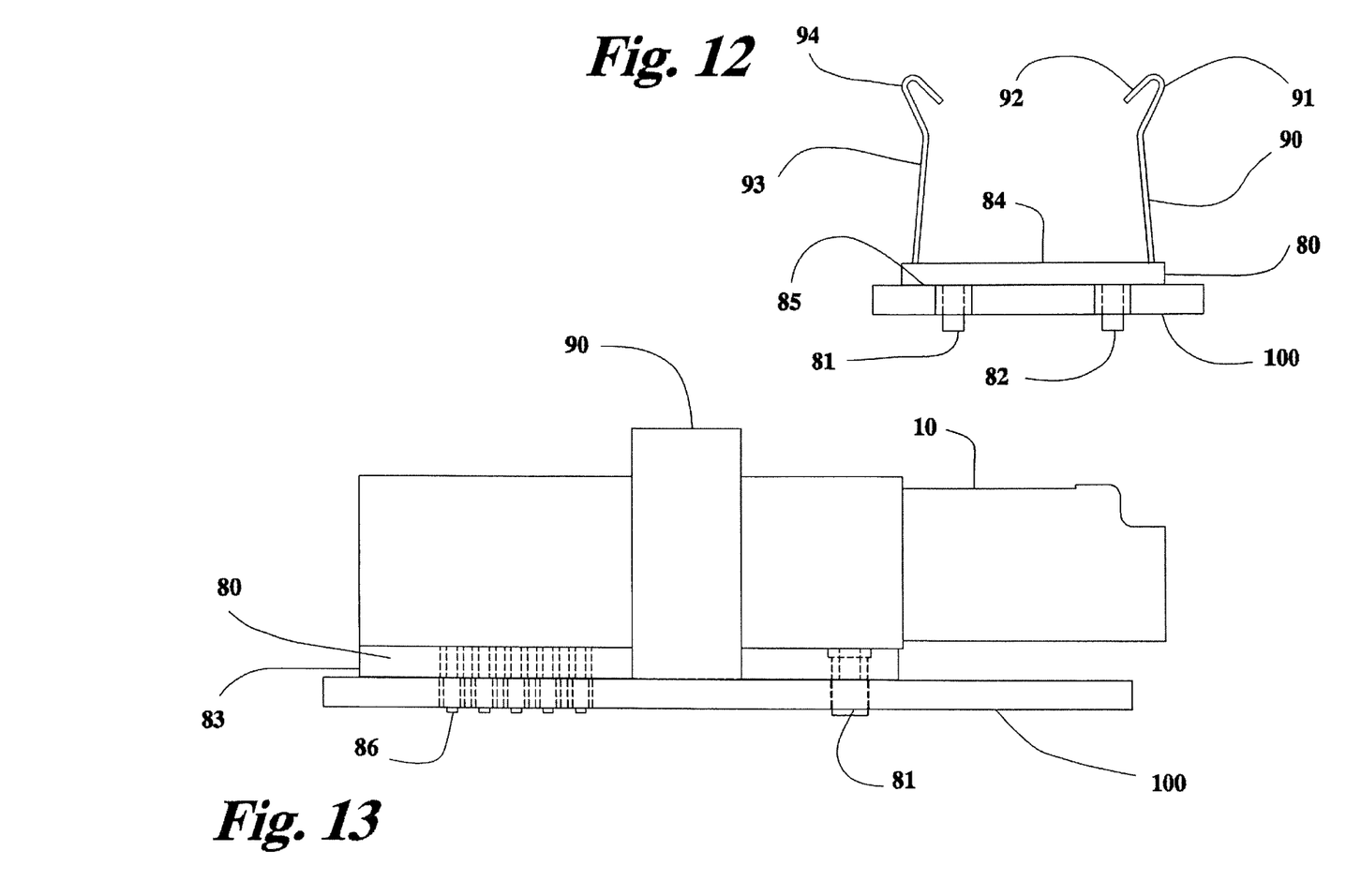
FIG. 12 is an end view of another embodiment of the small form factor transceiver socket mounted to a printed circuit board.
FIG. 13 is a side view of the small form factor transceiver socket of FIG. 12 with a small form factor transceiver mounted therein.

A second embodiment of the invention is shown in FIGS. 12 and 13. The small form factor transceiver socket 80, as shown in FIGS. 12 and 13, is known as a low profile device. As compared to the small form factor transceiver socket 30, shown in FIG. 7, the second surface 85 of the pinboard 83 is adjacent to a surface of the printed circuit board 100, thus, providing for a low profile design. Many aspects of the small form factor transceiver socket 80 are the same as the aspects of the small form factor transceiver socket 30 discussed in regards to FIGS. 7–11. The small form factor transceiver socket 80 includes a retention ground clip 90 which has a bottom surface which when mounted flush with the second surface 85 of the pinboard 83 enables the pinboard 83 to set flush with the surface of the printed circuit board 100. The retention ground clip 90 also has first and second arms 91, 93 and turned-back portions 92, 94 at the terminal end of each arm. Since the small form factor transceiver socket 80 rests so close to the circuit board 100, a large diameter portion of the attaching post receptacles 81, 82 pass through the printed circuit board 100.

Similarly, as shown in FIG. 13, the pin receptacles 86 pass through the printed circuit board 100. Typically, the small form factor transceiver socket 80 displayed in FIGS. 12 and 13 is wave soldered to the printed circuit board 100. Operation and materials of construction of the small form factor transceiver socket 80 are similar to those of the small form factor transceiver socket 30. Even though a portion of the printed circuit board needs to be constructed differently so as to accept the large diameter portions of the receptacles 81, 82, 86 the openings of the pin receptacles 86 and of the first and second attaching post receptacles 81, 82 formed on the first surface 84 of the pinboard 83 correspond to the contact pad land pattern 17 shown in FIG. 6. Therefore, it may now be understood that the present invention in the preferred embodiment discussed herein for FIGS. 7–13 and 17, provides a socket having an identical footprint to the SFF transceiver. Therefore, the manufacturer of the host PCB need not alter the host PCB layout to accommodate the socket and therefore the assembler of the host system may wait till the time of assembly of the specific batch of systems being assembled to decide to mount the transceiver directly to the PCB or to use a socket and mount the transceiver at a later time. In an alternate embodiment, the transceiver socket may be formed as an adapter where the footprint of the transceiver may be received by the socket and the land pattern of the host PCB. Thus, again allowing the host PCB to maintain a standard land pattern but using the socket to allow for attachment of transceivers having varying dimensions and footprints.

Figure 14:
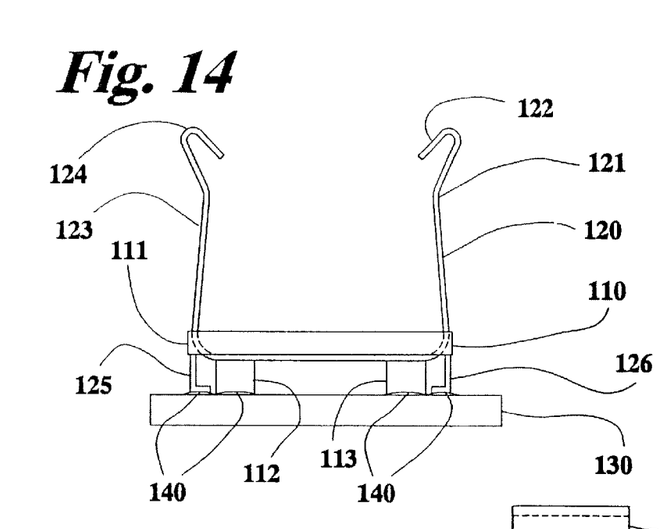
FIG. 14 is an end view of a third embodiment of the small form factor transceiver socket mounted to a printed circuit board.
Figure 15:
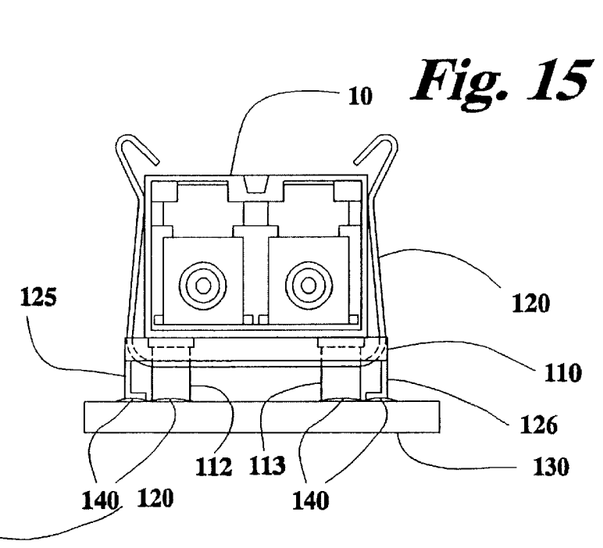
FIG. 15 is an end view of the small form factor transceiver socket of FIG. 14 with a small form factor transceiver mounted therein.
Figure 16:
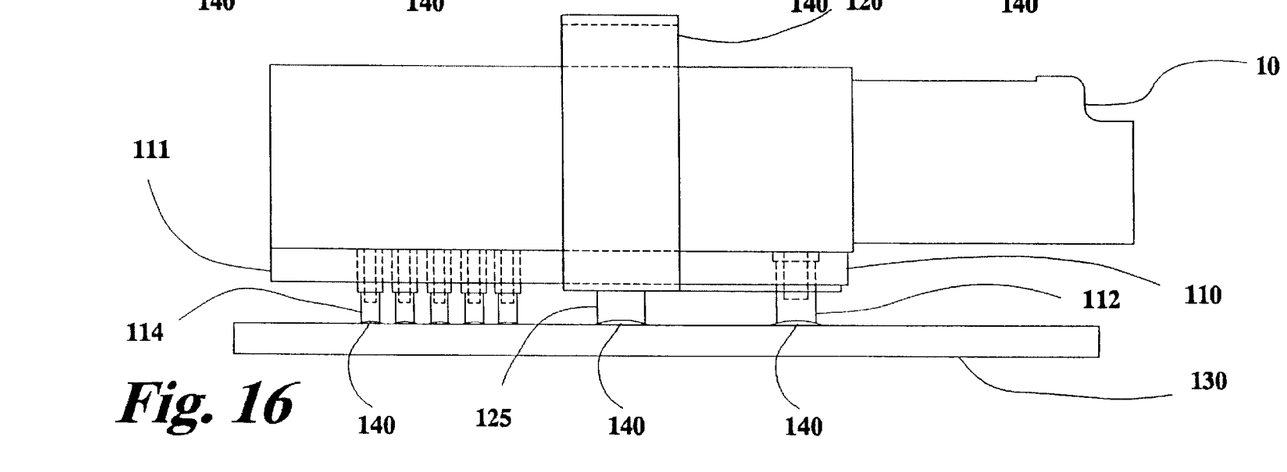
FIG. 16 is a side view of the small form factor transceiver socket of FIG. 15.
Figure 17:
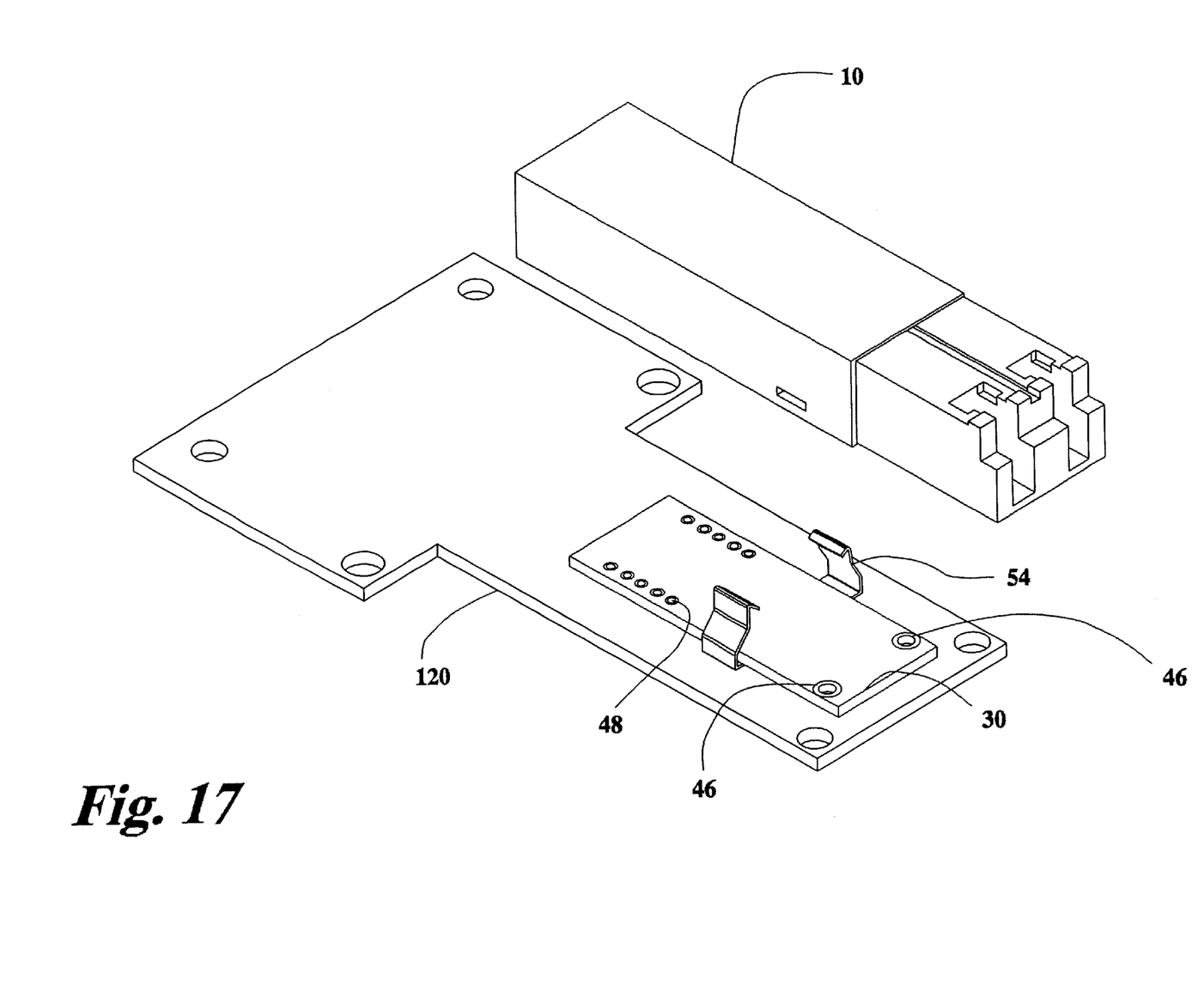
FIG. 17 is a perspective view of the first embodiment small form factor transceiver socket attached to the printed circuit board with the small factor transceiver.

A third embodiment of the invention is set forth in FIGS. 14–16. The small form factor transceiver socket 110, as shown in FIGS. 14–16, is a surface mount device. An end view of the small form factor transceiver socket 110 is shown in FIG. 14. The small form factor transceiver socket 110 includes a pinboard 111, a retention ground clip 120. The retention ground clip 120 is similar to the previously discussed retention ground clip 54. Retention ground clip 128 includes first and second arms 121, 123 and at terminal ends of each is formed a turned-back portion 122, 124. However, the retention ground clip 120 of this embodiment also includes first and second legs 125, 126. The small form factor transceiver socket 110 includes a first attaching post receptacle 112 and a second attaching post receptacle 113. The attaching post receptacles 112, 113 and the legs 125, 126, rest upon a surface of the printed circuit board 130. Thus, in contrast to the two previously discussed embodiments, no through holes are required in the PCB and no penetration of the printed circuit board 130 is required for mounting the small form factor transceiver socket 110 thereto.

FIG. 15 is an end view of the small form factor transceiver socket 110 of FIG. 14 having a small form factor transceiver 10 mounted therein. Even though the printed circuit 20 board is not perforated, as were the printed circuit boards of the previous embodiments, the openings of the pin receptacles 114 and of the first and second attaching post receptacles 112, 113 formed on the first surface of the pinboard 111 correspond to the contact pad land pattern 17 shown in FIG. 6. However, contact pads are formed on the PCB that correspond to the land pattern 17. Solder paste is placed on top of the contact pads. The solder paste is reflowed upon attachment of the socket on the PCB in order to securely mount the socket thereto.

FIG. 16 is a side view of the small form factor transceiver socket 110 mounted to the printed circuit board 130 and in which the small form factor transceiver 10 is removable mounted therein. FIG. 16, further shows the pin receptacles 114 abutting the surface of the printed circuit board 130. The soldering technique includes use of solder paste 140 between the receptacles 112, 113, and 114 the surface of the printed circuit board 130. The small form factor transceiver socket 110 is then attached to the printed circuit board by a re-flow soldering process. The operation of the small form factor transceiver socket 110 and also the materials of construction are similar to the previously discussed embodiments.

Obviously, numerous modifications and variations of the present invention are possible in light of the above teachings. It is therefore to be understood that within the scope of the appended claims, the invention may be practiced otherwise than as specifically described herein. For example, the present transceiver socket may be used for numerous transceivers other than an SFF transceiver. Therefore, it may be understood that the size and orientation of components of the socket will vary according to the size and orientation of the transceiver being socketed.

What is claimed is:

1. A transceiver socket for receiving a transceiver for providing data transfer, the transceiver socket comprising:

a pinboard having a first surface and a second surface, the pinboard having a first attaching post receptacle, a second attaching post receptacle, and a plurality of pin receptacles; and a retention ground clip connected to the first and second attaching post receptacles, the retention ground clip having first and second arms extending from a retention ground clip body, the first and second arms shaped for surrounding and contacting a portion of a surface of the transceiver, when the transceiver is mounted to the transceiver socket, so as to ground the surface of the transceiver to the first and second attaching post receptacles, and wherein the first attaching post receptacle, the second attaching post receptacle, and the plurality of pin receptacles each have an opening on the first surface of the pinboard, and wherein the openings of the first attaching post receptacle, the second attaching post receptacle, and the plurality of pin receptacles being positioned relative to each other so as to receive the attaching posts and pins of the transceiver, and wherein the first attaching post receptacle, the second attaching post receptacle, and the plurality of pin receptacles each have a portion protruding from the second surface of the pinboard so as to contact a printed circuit board, and wherein the first arm of the retention ground clip has a first turned back portion, and the second arm of the retention ground clip has a second turned back portion, the first and second turned back portions dimensioned so as to retain the transceiver in the transceiver socket from undesired removal when the transceiver is mounted to the transceiver socket, and wherein the first and second arms of the retention ground clip elastically deform upon application of a force imparted by an operator so as to remove the transceiver, and wherein, when the transceiver is mounted to the transceiver socket, the pinboard is disposed between the transceiver and the printed circuit board.

2. The transceiver socket according to claim 1 wherein the first attaching post receptacle, the second attaching post receptacle, and the plurality of pin receptacles are connected to the printed circuit board via through-hole mounting.

3. The transceiver socket according to claim 1 wherein the pinboard is connected to the printed circuit board via surface mounting of receptacles protruding from the second surface of the pinboard.

4. The transceiver socket according to claim 1 including a footprint for a small form factor transceiver and for receiving a small form factor transceiver.

5. The transceiver socket according to claim 4 wherein the small form factor transceiver provides bi-directional data transfer and converts optical and electrical signals, and wherein the socket transmits the electrical signals to the printed circuit board, where the printed circuit board is a host system printed circuit board.

6. The small form factor transceiver socket according to claim 4 wherein the first attaching post receptacle, the second attaching post receptacle, and the plurality of pin receptacles are each connected to the printed circuit board by way of a reflow solder process.

7. The small form factor transceiver socket according to claim 4 wherein the body of the retention ground clip includes a first flexible groove and a second flexible groove, wherein the first flexible groove places a portion of the first attaching post receptacle in a state of compression, and wherein the second flexible groove places a portion of the second attaching post receptacle in a state of compression.

8. The small form factor transceiver socket according to claim 7 wherein the retention ground clip is made of a stainless steel alloy material.

9. The small form factor transceiver socket according to claim 4 wherein the pinboard is made of an insulative polymer material.

10. The small form factor transceiver socket according to claim 9 wherein the receptacles of the pinboard are made of an electrically conductive material.

11. The small form factor transceiver socket according to claim 10 wherein the retention ground clip is made of a stainless steel alloy.

12. The small form factor transceiver socket according to claim 4 wherein a terminal end of the projecting portion of each receptacle terminates adjacent to a surface of the printed circuit board.

13. The small form factor transceiver socket according to claim 12 wherein the retention ground clip includes a first leg and a second leg, each of the first and second legs extending from the body of the retention ground clip, each of the first and second legs terminating at the printed circuit board, each of the first and second legs attached to the printed circuit board by way of the wave solder process.

14. The small form factor transceiver socket according to claim 4 wherein the first attaching post receptacle, the second attaching post receptacle, and the plurality of pin receptacles are each connected to the printed circuit board by way of a wave solder process.

15. The small form factor transceiver socket according to claim 14 wherein a portion of the projecting portion of each receptacle passes through the printed circuit board.

16. The small form factor transceiver socket according to claim 15 wherein the pinboard is positioned adjacent to the printed circuit board.

17. A transceiver module socket comprising:
   a substrate having a first side having a plurality of contact receiving areas and a second side having a plurality of mounting members corresponding to the plurality of contact receiving areas;
   a ground member attached to the substrate and electrically connected to a first mounting member of the plurality of mounting members of the substrate; and
   a retention member attached to the substrate wherein, upon mounting of a transceiver module to the socket, the retention member retains the transceiver module on the substrate and the ground member makes contact with a conductive portion of the transceiver module in order to ground the conductive portion of the transceiver module to a printed circuit board to which the socket is mounted and so that a plurality of contacts of the transceiver module mate with the plurality of contact receiving areas in order to electrically connect the plurality of contacts through the plurality of mounting members to the printed circuit board, and wherein,
   upon mounting of the transceiver module to the socket, the substrate is disposed between the transceiver module and the printed circuit board, and wherein
   the contact receiving areas include pin receptacles.

* * * * *